US011119045B2

(12) United States Patent
Lee et al.

(10) Patent No.: US 11,119,045 B2
(45) Date of Patent: Sep. 14, 2021

(54) APPARATUS AND METHOD FOR ANALYZING MICROBIOME

(71) Applicant: ELECTRONICS AND TELECOMMUNICATIONS RESEARCH INSTITUTE, Daejeon (KR)

(72) Inventors: Won Kyoung Lee, Daejeon (KR); Bong Kyu Kim, Daejeon (KR); Soo Jun Park, Seoul (KR); Chul Huh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 162 days.

(21) Appl. No.: 16/683,166

(22) Filed: Nov. 13, 2019

(65) Prior Publication Data
US 2020/0173928 A1 Jun. 4, 2020

(30) Foreign Application Priority Data
Nov. 30, 2018 (KR) .................. 10-2018-0153139

(51) Int. Cl.
*G01J 3/44* (2006.01)
*G01N 21/65* (2006.01)
(52) U.S. Cl.
CPC ... *G01N 21/65* (2013.01); *G01N 2201/06113* (2013.01); *G01N 2201/084* (2013.01)

(58) Field of Classification Search
CPC ............. G01N 21/65; G01N 21/658; G01N 2021/656; G01J 3/44; G01J 3/02
USPC ................................................ 356/301
See application file for complete search history.

(56) References Cited

U.S. PATENT DOCUMENTS

| 4,855,243 | A | 8/1989 | Simic-Glavaski |
| 2010/0248352 | A1 | 9/2010 | Song et al. |
| 2014/0163350 | A1 | 6/2014 | Huh et al. |

FOREIGN PATENT DOCUMENTS

KR 101857061 B1 5/2018

OTHER PUBLICATIONS

Dharmesh Harwani, "The Great Plate Count Anomaly and the Unculturable Bacteria", International Journal of Scientific Research, vol. 2, pp. 350-351, Sep. 2013.
Esther Singer et al., "Capturing the genetic makeup of the active microbiome in situ", The ISME Journal, vol. 11, pp. 1946-1963, 2017.
Hannelore Daniel et al., "High-fat diet alters gut microbiota physiology in mice", The ISME Journal, vol. 8, pp. 295-308, 2014.

*Primary Examiner* — Md M Rahman

(57) ABSTRACT

An apparatus for analyzing microbiome according to an embodiment of the inventive concept includes a light source unit configured to excite first light, a sample unit on which a sample to which the first light is incident is disposed, and a data analysis unit configured to receive second light emitted from the sample unit and analyze microbiome in the sample from the second light. Here, the sample unit includes a conductive polymer structure that surrounds the sample.

20 Claims, 9 Drawing Sheets

APPARATUS AND METHOD FOR ANALYZING MICROBIOME

CROSS-REFERENCE TO RELATED APPLICATIONS

This U.S. non-provisional patent application claims priority under 35 U.S.C. § 119 of Korean Patent Application No 10-2018-0153139, filed on Nov. 30, 2018, the entire contents of which are hereby incorporated by reference.

BACKGROUND

The present disclosure herein relates to an apparatus and method for analyzing microbiome, and more particularly, to an apparatus and method for analyzing microbiome using a conductive polymer.

Various kinds of microbiome existing in a human body may closely interact with human cells and tissues. Particularly, the gene, protein, and metabolite of intestinal microbiome may generate a gene expression of a human body or an adverse reaction with a tissue cell, or cause immune system disorder, thereby generating diseases. Thus, in recent years, a technique of diagnosing a disease by measuring a distribution variation and a genetic variation of microbiome existing in a human body has been significantly issued. Also, in addition to a disease diagnosis using microbiome, various treatment methods based on the microbiome, e.g., an immune anticancer drug, have been researched.

In order to measure the distribution and variation of the intestinal microbiome, typically, a method for analyzing a gene by extracting DNA, a method for inspecting excrement through naked eyes or a microscope, and a method for cultivating bacteria have been performed. The DNA genetic test is a technique of extracting DNA from a sample and analyzing a gene sequence using a DNA sequencing technique based on PCR (polymerase chain reaction) amplification. When the above-described genetic analysis method is performed, a sample treatment process for extracting DNA is difficult, and a time for obtaining results takes considerably long. The method for inspecting a specific point of a cell through naked eyes or a microscope may not work properly in molecular units, and thus hardly find an exact microbiome distribution or bacteria.

SUMMARY

The present disclosure provides an apparatus and method for analyzing microbiome with improved reliability.

The object of the present disclosure is not limited to the aforesaid, but other objects not described herein will be clearly understood by those skilled in the art from descriptions below.

An embodiment of the inventive concept provides an apparatus for analyzing microbiome, the apparatus including: a light source unit configured to emit first light; a sample unit on which a sample to which the first light is incident is disposed; and a data analysis unit configured to receive second light emitted from the sample unit and analyze microbiome in the sample from the second light. Here, the sample unit includes a conductive polymer structure that surrounds the sample, and the second light has an intensity that is amplified through the conductive polymer structure.

In an embodiment, the conductive polymer structure may have a box shape in which the sample is disposed.

In an embodiment, the conductive polymer structure may have a film shape in which the sample is sealed.

In an embodiment, the light source unit may include: a laser; a probe part configured to emit the first light; and a first optical fiber and a second optical fiber, which connect the laser and the probe part.

In an embodiment, the data analysis unit may include: a spectrometer configured to measure a spectrum of a scattering light signal of the second light; and a data processing part configured to analyze spectrum data measured by the spectrometer.

In an embodiment, the data analysis unit may further include a third optical fiber configured to receive the second light and transmit the received light to the spectrometer.

In an embodiment, the light source unit may further include a distributor disposed between the first optical fiber and the second optical fiber, the first optical fiber may be disposed between the laser and the distributor, and the second optical fiber may be disposed between the distributor and the probe part.

In an embodiment, the third optical fiber may be disposed between the distributor and the spectrometer.

In an embodiment, the probe part may receive the second light, and the received second light may be transmitted to the third optical fiber through the second optical fiber.

In an embodiment, the distributor may have one end connected to the first optical fiber and the third optical fiber and the other end connected to the second optical fiber.

In an embodiment, the apparatus may further include a filter disposed on the third optical fiber to filter a Raman scattering light signal containing information of the sample from the second light.

In an embodiment, the filter may extract only the scattering light having the information of the sample from the second light.

In an embodiment, the filter may be a notch filter.

In an embodiment, the conductive polymer structure may include a polyester-based resin, an epoxy-based resin, or a polyurethane-based resin.

In an embodiment of the inventive concept, a method for analyzing microbiome includes: preparing a sample surrounded by a conductive polymer structure; allowing first light to be incident to the sample; receiving scattered second light from the sample; and analyzing microbiome in the sample using the second light.

In an embodiment, the second light may be scattering light from the sample due to the first light, and the conductive polymer structure may amplify a scattering signal in the sample.

In an embodiment, the analyzing of the microbiome may be analyzing using a Raman spectrum.

In an embodiment, the conductive polymer structure may have a box shape in which the sample in a liquid state is disposed.

In an embodiment, the conductive polymer structure may have a film shape in which the sample in a gel or solid state is sealed.

Particularities of other embodiments are included in the detailed description and drawings.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
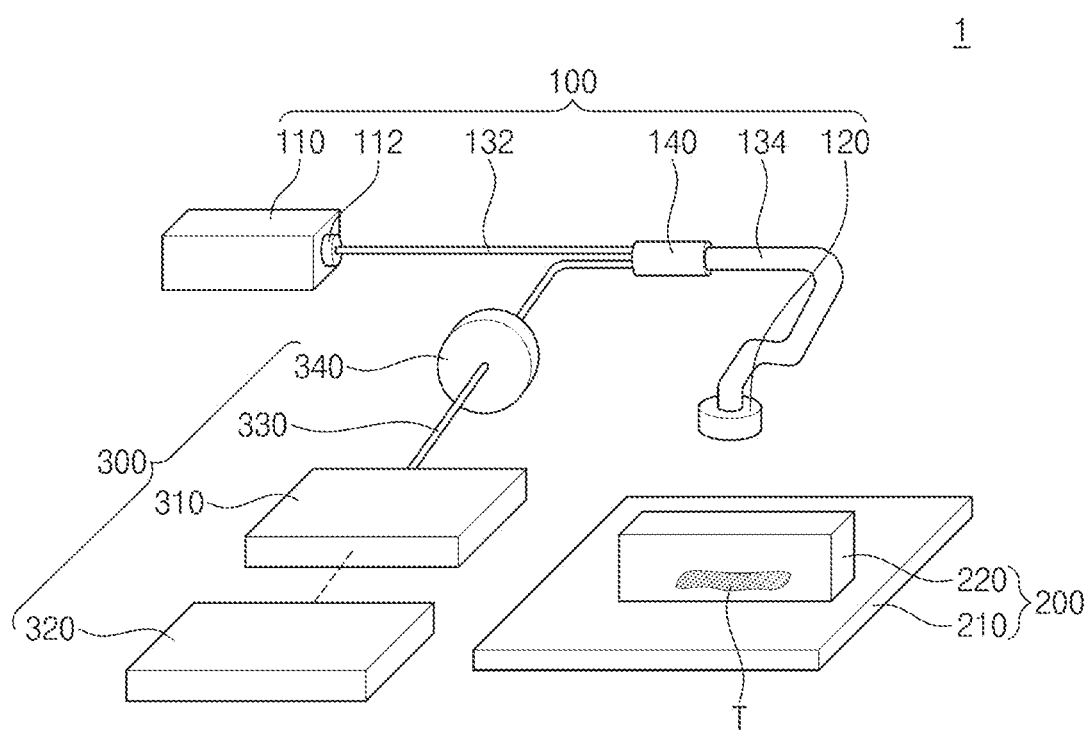
FIG. 1 is a view illustrating a microbiome analysis apparatus according to an embodiment of the inventive concept.

Advantages and features of the present invention, and implementation methods thereof will be clarified through following embodiments described with reference to the accompanying drawings. The present invention may, however, be embodied in many different forms and should not be construed as being limited to the embodiments set forth herein. Rather, these embodiments are provided so that this disclosure will be thorough and complete, and will fully convey the concept of the invention to those skilled in the art. Further, the present invention is only defined by scopes of claims. Like reference numerals refer to like elements throughout.

In the following description, the technical terms are used only for explaining a specific exemplary embodiment while not limiting the present disclosure. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

Additionally, the embodiment in the detailed description will be described with sectional views as ideal exemplary views of the present invention. Also, in the figures, the dimensions of layers and regions are exaggerated for clarity of illustration. Accordingly, shapes of the exemplary views may be modified according to manufacturing techniques and/or allowable errors. Therefore, the embodiments of the present invention are not limited to the specific shape illustrated in the exemplary views, but may include other shapes that may be created according to manufacturing processes. Areas exemplified in the drawings have general properties, and are used to illustrate a specific shape of an apparatus. Thus, this should not be construed as limited to the scope of the present invention.

FIG. 1 is a view illustrating a microbiome analysis apparatus 1 according to an embodiment of the inventive concept. The microbiome analysis apparatus 1 may analyze microbiome in a sample. For example, the microbiome analysis apparatus 1 may analyze the kind of the microbiome in the sample. The microbiome analysis apparatus 1 may include a light source unit 100, a sample unit 200, and a data analysis unit 300.

The light source unit 100 may include a laser 110, an adaptor 112, a probe part 120, a first optical fiber 132, a second optical fiber 134, and a distributor 140. The light source unit 100 may emit first light (refer to L1 in FIG. 5A) to the sample unit 200. The laser 110 may be a diode laser. Although the laser 110 may be, e.g., a yttrium aluminum garnet (YAG) laser, the embodiment of the inventive concept is not limited thereto. The adaptor 112 may align the first light L1 when the first light L1 generated from the laser 110 is transmitted to the first optical fiber 132. The first light L1 may be emitted to the sample unit 200 through the probe part 120. Although the first light L1 may be incident perpendicularly to a plane on which the sample unit 200 is disposed, the embodiment of the inventive, concept is not limited thereto.

The first optical fiber 132 and the second optical fiber 134 may be provided between the laser 110 and the probe part 120. The distributor 140 may be disposed between the first optical fiber 132 and the second optical fiber 134. The first optical fiber 132 may be disposed between the laser 110 and the distributor 140. The first optical fiber 132 may connect the laser 110 and the distributor 140 and transmit the first light L1 from the laser 110 to the second optical fiber 134. The second optical fiber 134 may be disposed between the distributor 140 and the probe part 120. The second optical fiber 134 may connect the distributor 140 and the probe part 120 to transmit the first light L1. Although not shown, the second optical fiber 134 may include a plurality of optical fiber bundles.

The sample unit 200 may include a stage 210 and a conductive polymer structure 220. The conductive polymer structure 220 may be disposed on the stage 210. The conductive polymer structure 220 may surround a sample T. The conductive polymer structure 220 may include a conductive polymer. The conductive polymer may include a polyester-based resin, an epoxy-based resin, or a polyurethane-based resin. Although the conductive polymer may include, e.g., polyacetylene, polyaniline, polythiophene, polypyrrole, and polyphthalocyanines, the embodiment of the inventive concept is not limited thereto. The sample may include microbiome. Although the sample T may include an organism or a portion (e.g., excrement, etc.) discharged from the organism, the embodiment of the inventive concept is not limited thereto.

Figure 2A:
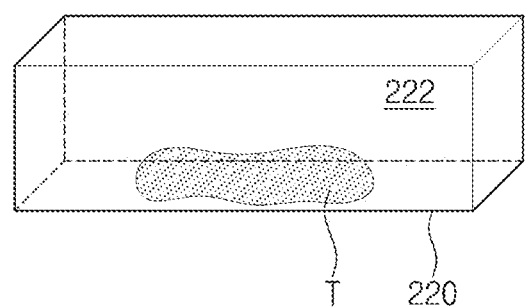
FIG. 2A is a view illustrating a conductive polymer structure according to an embodiment of the inventive concept.
Figure 2B:
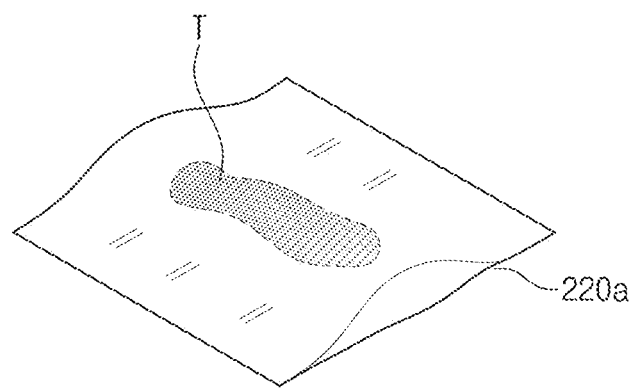
FIG. 2B is a view illustrating a conductive polymer structure according to another embodiment of the inventive concept.

FIG. 2A is a view illustrating the conductive polymer structure 220 according to an embodiment of the inventive concept. FIG. 2B is a view illustrating a conductive polymer structure 220a according to another embodiment of the inventive concept. Referring to FIG. 2A, the conductive polymer structure 220 may have a box shape, and the sample T may be disposed an inside 222 thereof. Alternatively, referring to FIG. 2B, the conductive polymer stricture 220a may have a film shape, and the sample T may be sealed therein. The conductive polymer structure 220a may vacuum-compress the sample T.

Figure 3A:
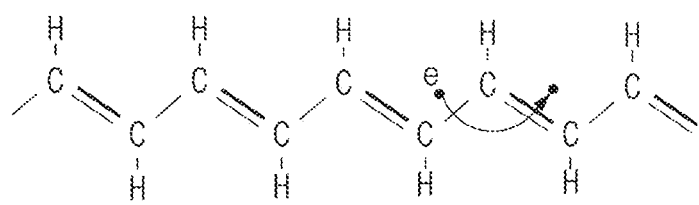
FIG. 3A is a view illustrating a chemical structure of a conductive polymer according to an embodiment of the inventive concept.

FIG. 3A is a view illustrating a conductive polymer according to an embodiment. Referring to FIG. 3A, the conductive polymer may include a chain structure in which a single bond and a double bond of carbon atoms are repeated. Since an electron (e-) having a π bond, which is a relatively weak bond, is movable in the double bond, the conductive polymer becomes electrically conductive.

Figure 3B:
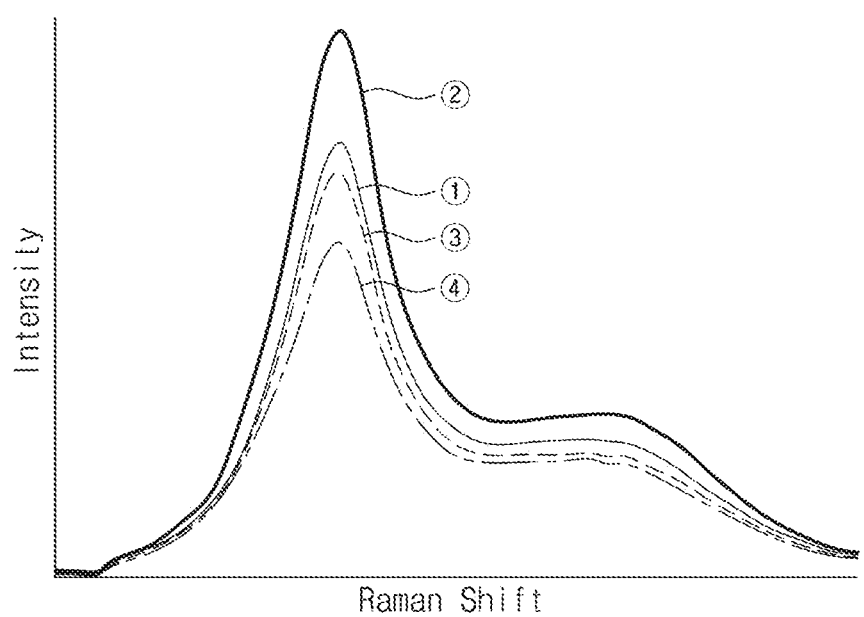
FIG. 3B is a graph comparing and illustrating Raman scattering spectra.

FIG. 3B is a graph comparing and illustrating the Raman spectra. Reference numeral ① represents the Raman spectrum obtained when light is directly incident to the sample, and reference numeral ② represents the Raman spectrum obtained when light is incident to a sample surrounded by the conductive polymer structure according to an embodiment of the inventive concept. Reference numerals ③ and ④, as comparative examples, represent the Raman spectra obtained when light is incident to a sample surrounded by a non-conductive polymer. The non-conductive polymer may have a low transmittance and thus obtain a low Raman scattering signal. Referring to FIG. 3B, it may be seen that the Raman spectrum obtained when the sample is surrounded by the conductive polymer structure has an amplified intensity. The conductive polymer may enhance the intensity of the scattering signal generated by a vibration between molecules. The scattering signal caused by the molecule vibration may have a different scattering frequency according to the kind of the microbiome.

Referring to FIG. 1 again, the data analysis unit 300 may include a spectrometer 310, a data processing part 320, a third optical fiber 330, and a filter 340. The spectrometer 310 may quantitatively measure an intensity of a spectrum of second light (refer to L2 in FIG. 5B). For example, the spectrometer 310 may quantitatively measure a spectrum of a scattering light signal of the second light L2. The spectrometer 310 may include a spectrometer, monochromator, or photodetector. The spectrometer 310 may obtain the spectrum data by measuring the intensity of the scattering signal as a function of wavelengths. The spectrometer 310 may transmit the measured spectrum data to the data processing part 320.

The data processing part 320 may classify the microbiome from the spectrum data to analyze a distribution thereof. The data processing part 320 may include a display portion (not shown).

The third optical fiber 330 may receive the second light L2 emitted from the sample T and transmit the received light to the spectrometer 310. The third optical fiber 330 may be disposed between the distributor 140 and the spectrometer 310. The third optical fiber 330 may be branched from the distributor 140. The distributor 140 may have one end connected to the first optical fiber 132 and the third optical fiber 330 and the other end connected to the second optical fiber 134.

The second light L2 may be scattering light generated from the sample T by the incident first light L1. As described above, the second light L2 may be amplified while passing through the conductive polymer structure 220 surrounding the sample T. The second light L2 may be received by the probe part 120. The second light L2 may be received by the probe part 120 and then transmitted to the third optical fiber 330 through the second optical fiber 134. In this specification, the second light L2 represents light having an intensity amplified through the conductive polymer structure 220.

The filter 340 may be disposed on the third optical fiber 330. The filter 340 may extract Raman scattering light containing information of the sample from the second light L2. For example, the filter 340 may remove information of the laser (e.g. a wavelength band of the laser) from the second light L2. The filter 340 may remove a Rayleigh scattering signal having the same wavelength band as the laser. The filter 340 may include a notch filter.

Figure 4:
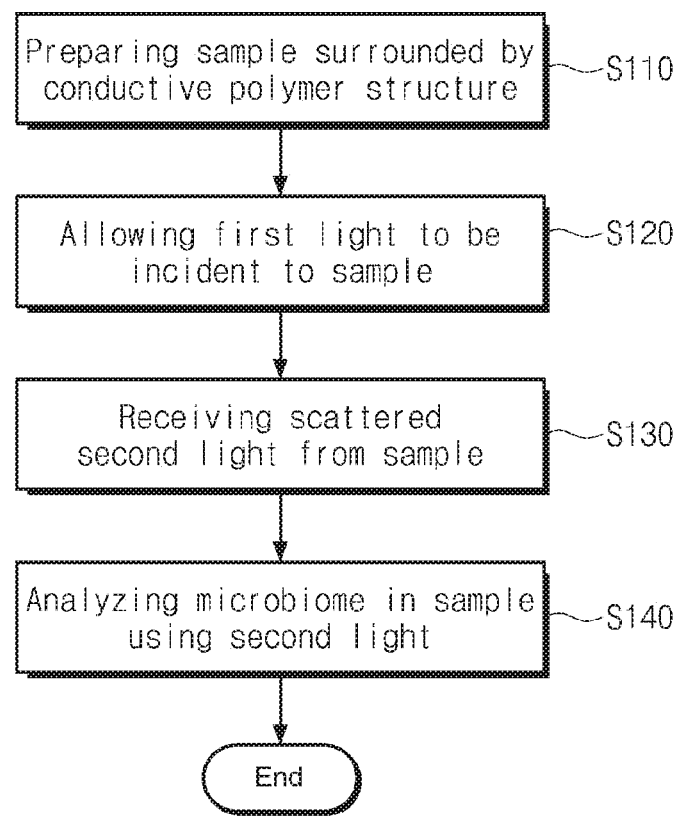
FIG. 4 is a flowchart representing a method for analyzing microbiome according to an embodiment of the inventive concept.

FIG. 4 is a flowchart representing a method for analyzing microbiome according to an embodiment of the inventive concept. FIGS. 5A to 5E are views showing the method for analyzing microbiome according to an embodiment of the inventive concept in FIG. 4. Hereinafter, the method for analyzing microbiome according to an embodiment of the inventive concept will be described with reference to FIGS. 4 and 5A to 5E.

First, referring to FIG. 4, the sample T surrounded by the conductive polymer structure 220 may be prepared in operation S110. The conductive polymer structure 220 may include the sample T therein and be loaded on the stage 210. Alternatively, the conductive polymer structure 220 may have a film shape that vacuum-seals the sample T.

Figure 5A:
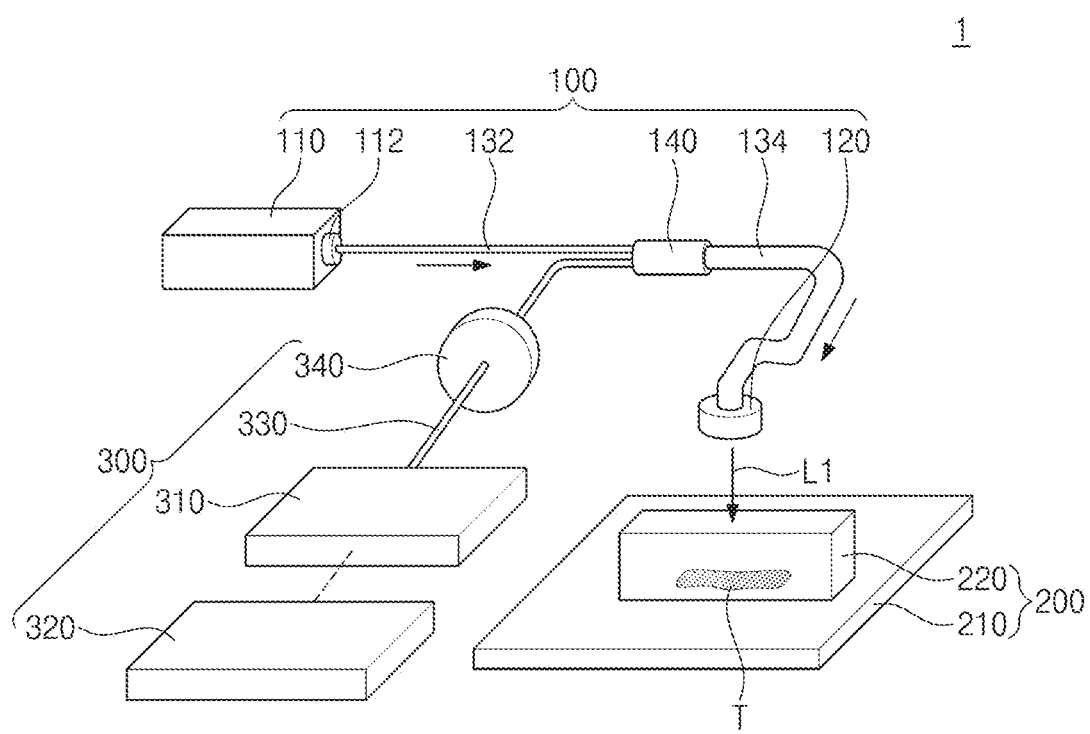
FIGS. 5A to 5E are views showing the method for analyzing microbiome according to an embodiment of the inventive concept in FIG. 4.

Referring to FIGS. 4 and 5A, the first light L1 may be incident to the sample T in operation S120. The first light L1 may be incident to the sample T through the laser 110, the first optical fiber 132, and the second optical fiber 134 of the light source unit 100. The first light L1 may be incident perpendicularly to the plane on which the conductive polymer structure 220 is disposed. The conductive polymer structure 220 may allow the first light L1 to be entirely incident nearly zero loss due to reflection or absorption.

Figure 5B:
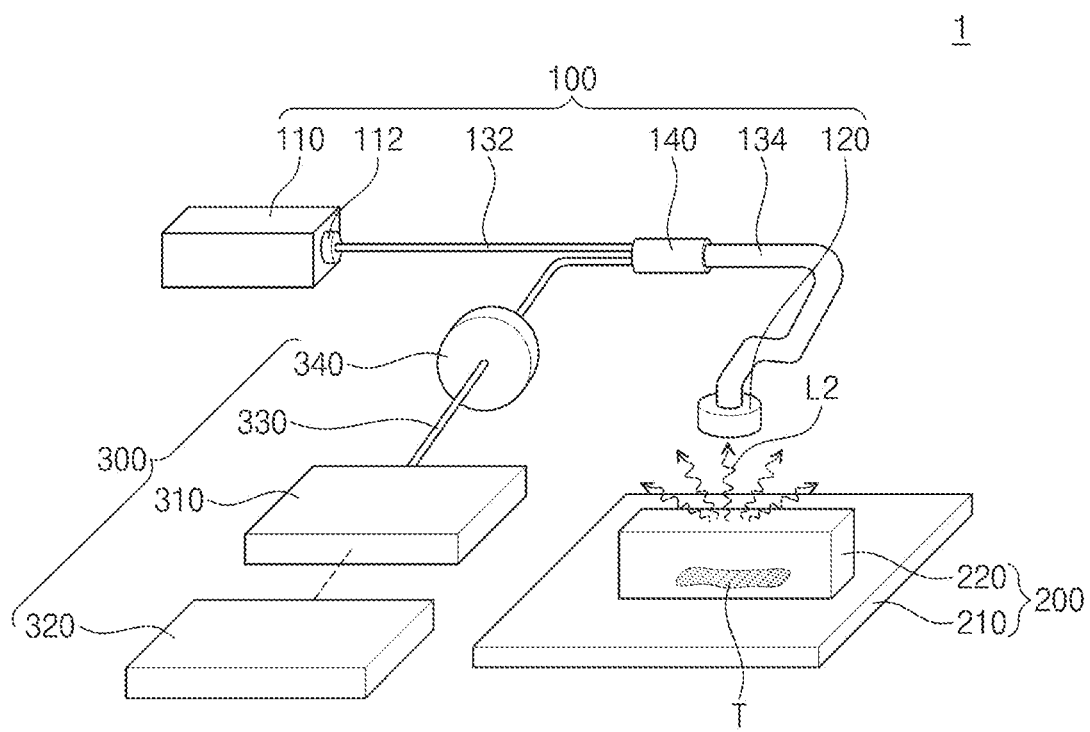

Referring to FIGS. 4 and 5B, the second light L2 emitted from the sample T may be received in operation S130. The second light L2 may be scattering light generated from the sample by the incident first light L1. Although the second light L2 may be scattered in various directions, light in one direction (e.g., a direction perpendicular to the plane on which the conductive polymer structure is disposed) may be mainly incident. The second light L2 may be received by the probe part 120 and transmitted through the second optical fiber 134.

Figure 5C:
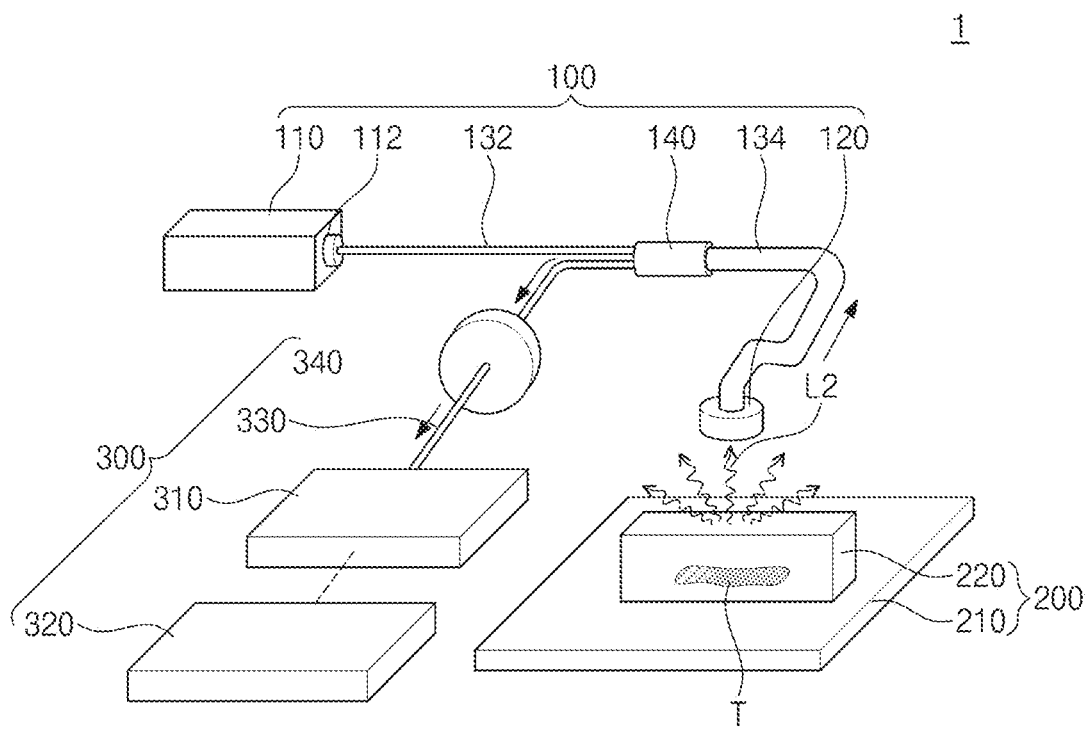

Referring to FIGS. 4 and 5C, the microbiome in the sample T may be analyzed by using the second light L2 in operation S140. The distributor 140 may transmit the second light L2, which is transmitted through the second optical fiber 134, to the third optical fiber 330. The third optical fiber 330 may transmit the second light L2 to the spectrometer 310. A feature of analyzing the microbiome in the sample T may include a feature of analyzing by using Raman spectrum caused by a vibration generated from the microbiome that absorbs the incident light L1. Here, the filter 340 may extract Raman scattering light having information of the sample from the second light L2. For example, the filter 340 may remove light having information of the laser (e.g., a wavelength band of the laser) from the second light L2. The filter 340 may remove a Rayleigh scattering signal. The filter 340 may include a notch filter.

The spectrometer 310 may quantitatively measure a spectrum of second light L2. The spectrometer 310 may include a spectrometer, monochromator, or photodetector. The spectrometer 310 may obtain the spectrum data by measuring spectrum data. The spectrometer 310 may transmit the spectrum data of the scattering light to the data processing part 320.

The data processing part 320 may classify the microbiome from the spectrum data of the scattering light to analyze a distribution thereof. The data processing part 320 may include a display portion (not shown).

Figure 5D:
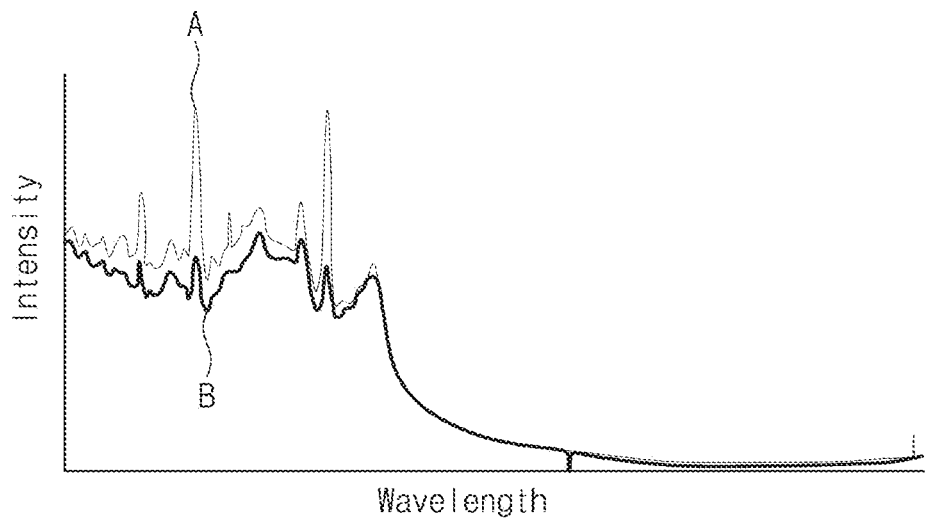
Figure 5E:
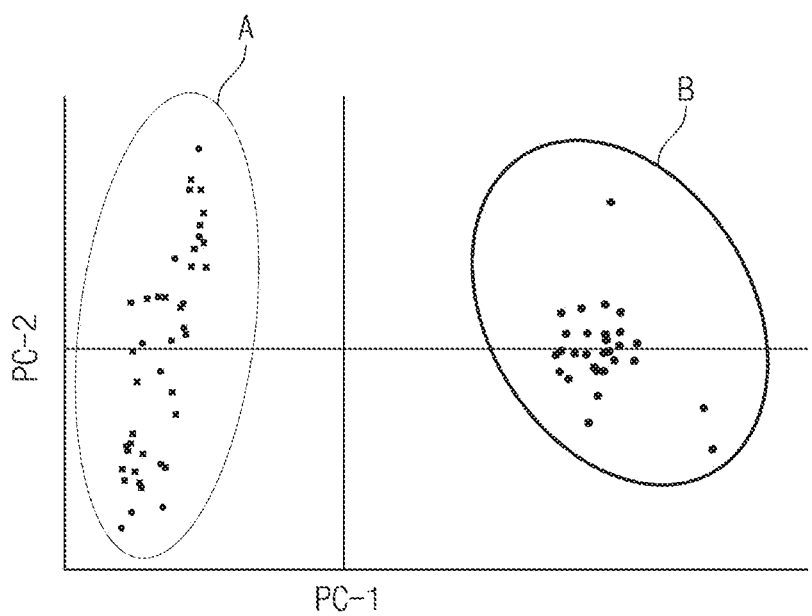

Referring to FIG. 5D, it may be seen that the spectrum data of the second light L2, which is filtered by the filter 340. FIG. 5D illustrates spectrum data of two kinds of samples A and B. When the data are applied to the principal component analyzer (PCA) algorithm by using FIG. 5D, the microbiome contained in each of the two kinds of samples A and B may be analyzed as in FIG. 5E. For example, A may be a sample containing *Staphylococcus aureus*, and B may be a sample containing *Staphylococcus epidermidis*

According to an embodiment of the inventive concept, the sample in a state of being surrounded by the conductive polymer structure may be measured, transferred, or the like.

Particularly, in case of a sample having a bad odor, e.g., excrement of an organism, or a sample that is difficult to be treated, the sample treatment may be further simplified. Also, when the conductive polymer is used, the scattering signal may be amplified, and thus accuracy and reliability of the analysis may improve.

Figure 6:
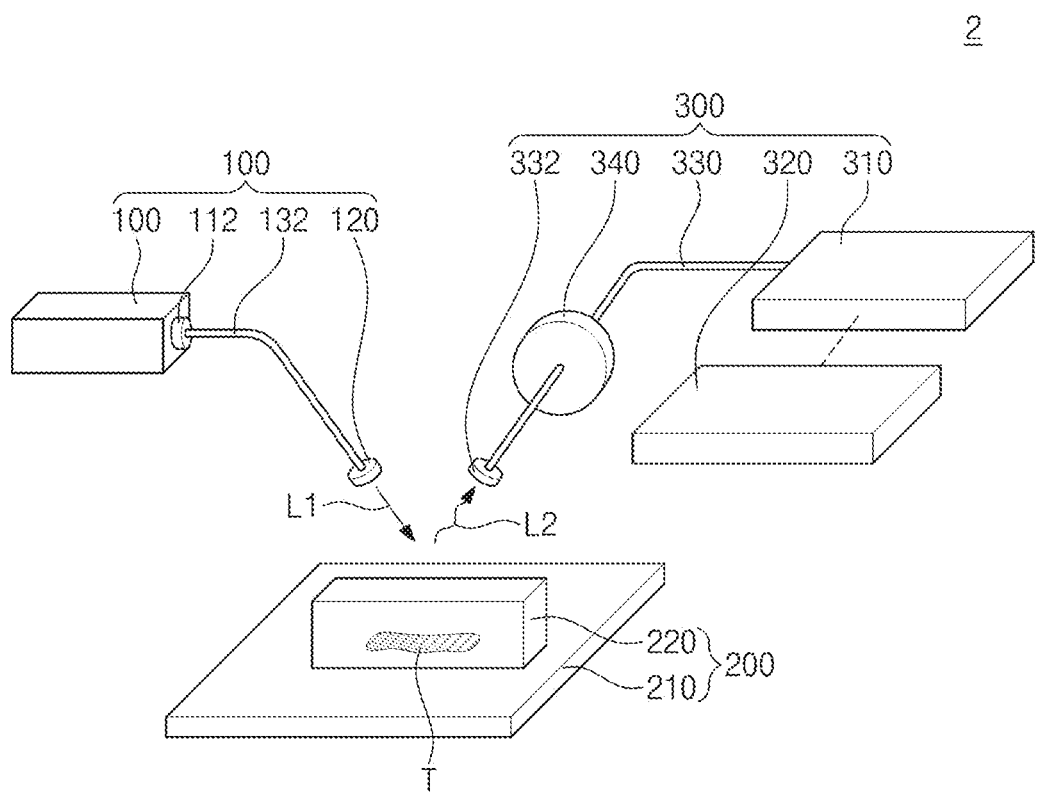
FIG. 6 is a view illustrating a microbiome analysis apparatus according to an embodiment of the inventive concept.

FIG. 6 is a view illustrating a microbiome analysis apparatus 2 according to an embodiment of the inventive concept. In case of the microbiome analysis apparatus 2 of FIG. 6, overlapped description on components that are substantially the same as or similar to the microbiome analysis apparatus 1 described with reference to FIG. 1 will be omitted. Unlike the microbiome analysis apparatus 1 of FIG. 1, the microbiome analysis apparatus 2 of FIG. 6 may further include a light receiving part for receiving the second light L2.

A light receiving probe part 332 may be provided at an end of the third optical fiber 330 of FIG. 6. Each of the first light L1 and the second light L2 may have the same angle with respect to a plane perpendicular to the plane on which the conductive polymer structure 220 is disposed. Alternatively, a sum of angles with respect to the plane perpendicular to the plane on which the conductive polymer structure 220 is disposed may be about 90°. As described above, although the second light L2 may include scattering light in various directions, only light in a specific direction, which is received by the light receiving probe part 332, is illustrated for simplicity of the drawing.

According to embodiments of the inventive concept, the sample in a state of being surrounded by the conductive polymer structure may be measured, transferred, or the like. Particularly, in case of a sample having a bad odor, e.g., the excrement of an organism, or a sample that is difficult to be treated, the sample treatment may be further simplified. Also, when the conductive polymer is used, the scattering signal may be amplified, and thus the accuracy and reliability of the analysis may improve.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed. Therefore, the embodiments described above include exemplary in all respects and not restrictive, but it should be understood.

What is claimed is:

1. An apparatus for analyzing microbiome, comprising:
a light source unit configured to emit first light;
a sample unit on which a sample to which the first light is incident is disposed; and
a data analysis unit configured to receive second light emitted from the sample unit and analyze microbiome in the sample from the second light,
wherein the sample unit comprises a conductive polymer structure that surrounds the sample, and the second light has an intensity that is amplified through the conductive polymer structure.

2. The apparatus of claim 1, wherein the conductive polymer structure has a box shape in which the sample is disposed.

3. The apparatus of claim 1, wherein the conductive polymer structure has a film shape in which the sample is sealed.

4. The apparatus of claim 1, wherein the light source unit comprises:
a laser;

a probe part configured to emit the first light; and
a first optical fiber and a second optical fiber, which connect the laser and the probe part.

5. The apparatus of claim 4, wherein the light source unit further comprises a distributor disposed between the first optical fiber and the second optical fiber, and
the first optical fiber is disposed between the laser and the distributor, and the second optical fiber is disposed between the distributor and the probe part.

6. The apparatus of claim 5, wherein the data analysis unit further comprises:
a spectrometer configured to measure a spectrum of a scattering light signal of the second light;
a data processing part configured to analyze spectrum data measured by the spectrometer; and
a third optical fiber configured to receive the second light to transmit the received light to the data analysis unit, wherein the third optical fiber is disposed between the distributor and the spectrometer.

7. The apparatus of claim 6, wherein the probe part receives the second light, and the received second light is transmitted to the third optical fiber through the second optical fiber.

8. The apparatus of claim 6, wherein the distributor has one end connected to the first optical fiber and the third optical fiber and the other end connected to the second optical fiber.

9. The apparatus of claim 1, wherein the data analysis unit comprises:
a spectrometer configured to measure a spectrum of a scattering light signal of the second light; and
a data processing part configured to analyze spectrum data measured by the spectrometer.

10. The apparatus of claim 9, wherein the data analysis unit further comprises a third optical fiber configured to receive the second light and transmit the received light to the spectrometer.

11. The apparatus of claim 10, further comprising a filter disposed on the third optical fiber to filter a Raman scattering light signal containing information of the sample from the second light.

12. The apparatus of claim 11, wherein the filter extracts only the information of the sample from the second light.

13. The apparatus of claim 11, wherein the filter is a notch filter configured to extract a signal in a specific wavelength band.

14. The apparatus of claim 1, wherein the second light is scattering light of the first light incident to the sample.

15. The apparatus of claim 1, wherein the conductive polymer structure comprises a polyester-based resin, an epoxy-based resin, or a polyurethane-based resin.

16. A method for analyzing microbiome, comprising:
preparing a sample surrounded by a conductive polymer structure;
allowing first light to be incident to the sample;
receiving scattered second light from the sample; and
analyzing microbiome in the sample using the second light.

17. The method of claim 16, wherein the second light is scattering light from the sample due to the first light, and
the conductive polymer structure amplifies a scattering signal in the sample.

18. The method of claim 16, wherein the analyzing of the microbiome is analyzing using a Raman spectrum.

19. The method of claim 16, wherein the conductive polymer structure has a box shape in which the sample in a liquid state is disposed.

20. The method of claim 16, wherein the conductive polymer structure has a film shape in which the sample in a gel or solid state is sealed.

* * * * *